UNITED STATES PATENT OFFICE 2,516,611

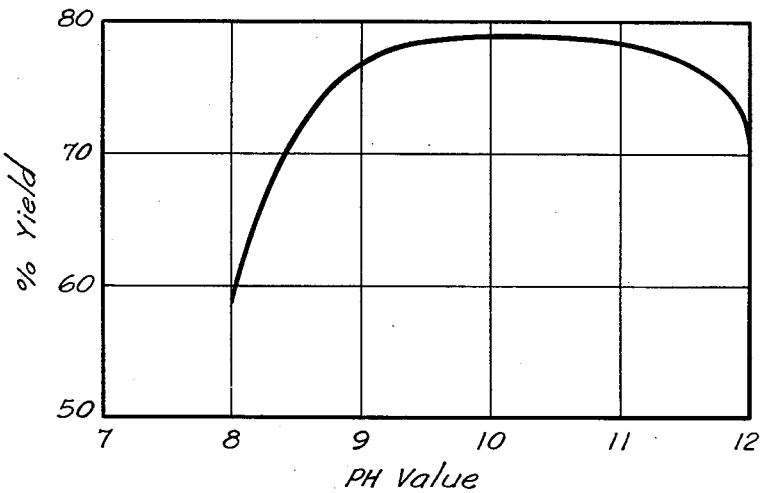
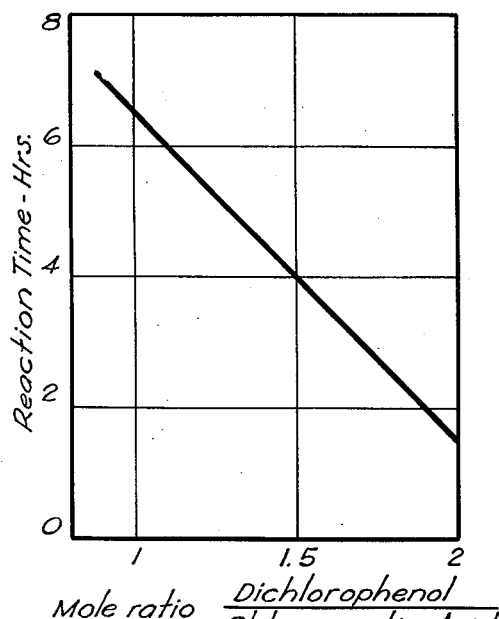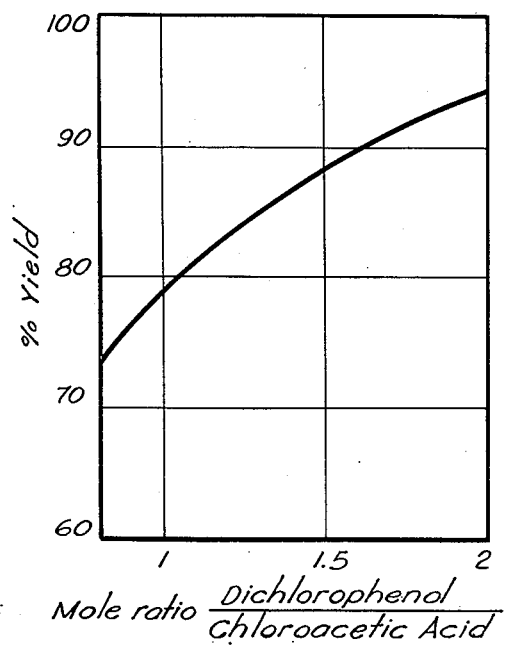

PRODUCTION OF AROMATIC-OXY-ALIPHATIC CARBOXYLATES

Luther F. Berhenke and Louis E. Begin, Midland, Mich., assignors to The Dow Chemical Company, Midland, Mich., a corporation of Delaware Application June 12, 1946, Serial No. 676,218

12 Claims. (Cl. 260—521)

This invention concerns an improved method for the production of salts of aromatic-oxy-aliphatic carboxylic acids by a reaction between salts of a phenol and of a saturated chloro-aliphatic carboxylic acid.

This general reaction is well known and may be illustrated by the following equation for the formation of sodium phenoxyacetate from the sodium salts of phenol and chloro-acetic acid:

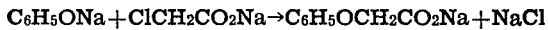

$$C_6H_5ONa + ClCH_2CO_2Na \rightarrow C_6H_5OCH_2CO_2Na + NaCl$$

Such reaction is usually carried out by heating to boiling an aqueous solution of the salts of the phenolic and chloro-aliphatic acid reactants. During the reaction, a considerable portion of the chloro-aliphatic acid salt reactant is destroyed due to occurrence of side reactions, such as hydrolysis of its chlorine substituent, with the result that the yield, based on said reactant, is undesirably low. The yield varies with different reactants and is known to be particularly low when using a salt of a nitrophenol in the reaction.

We have observed that the pH value of a reaction mixture decreases during a reaction carried out in the conventional manner just mentioned. We have further found that the rate and extent of the side reaction, or reactions, which cause loss of a portion of the chloro-aliphatic acid salt reactant, is dependent upon the pH value of the reaction mixture and that, by initially bringing the mixture to a degree of alkalinity within a narrow range of optimum pH values, and by adding alkali during the reaction as necessary in order to maintain the mixture within said range of pH values, such side reactions may be curtailed and the yield of the salt of an aromatic-oxy-aliphatic acid may be improved.

The optimum pH values vary somewhat with changes in the kind of phenol or alkali employed in the reaction, but in all instances are the pH values initially possessed by an aqueous reaction mixture which contains sufficient alkali to form salts of all of the chloro-aliphatic acid and from 80 to 100 per cent of the phenolic reactant. In other words, the amount of aqueous alkali should be sufficient to cause solution of the chloro-aliphatic acid and phenolic reactants, but should not exceed that theoretically required to form salts of both reactants. During the reaction, alkali is added to maintain the mixture within this range of pH values. It may be mentioned that the optimum degree of alkalinity, as just defined, extends over a pH range of about 2 or less, e. g. when using sodium hydroxide and 2,4-dichlorophenol as starting materials, the optimum pH range is from 9 to 11. An increase or decrease in alkalinity outside the optimum range of pH values results in a pronounced decrease in yield of the desired product on a basis of the chloro-aliphatic acid reactant.

Any of a wide variety of phenols may be used as reactants in the process. Examples of suitable phenolic reactants are phenol itself, 2-chlorophenol, 3-chlorophenol, 4-chlorophenol, 2,4-dichlorophenol, 2,6-dichlorophenol, 2,4,6-trichlorophenol, 2 - bromophenol, 2,4 - dibromophenol, cresol, 2-ethylphenol, 3-ethylphenol, 4-ethylphenol, isopropylphenol, 2-methoxyphenol, 2,6-dimethoxyphenol, 2-nitrophenol, 4-nitrophenol, alpha-naphthol, beta-naphthol, 2-phenylphenol, or 4-phenylphenol, etc. The phenol may be used as such, or in the form of a water-soluble salt of the same.

Examples of saturated chloro-aliphatic acids suitable for use as starting materials are chloroacetic acid, alpha-chloropropionic acid, beta-chloropropionic acid, alpha-chlorobutyric acid, beta-chlorobutyric acid, or gamma-chlorobutyric acid, etc. Apparently, any saturated monochloro-aliphatic monocarboxylic acid, or water-soluble salt thereof, can be used.

As the alkali for forming soluble salts of the phenolic and chloro-aliphatic acid reactants and for maintaining the necessary degree of alkalinity during the reaction, alkali metal hydroxides, such as sodium, potassium, or lithium hydroxide, are preferred. Other alkalies, e. g. ammonia, sodium carbonate, lime, or barium hydroxide, etc., may in some instances be used alone or in conjunction with an alkali metal hydroxide.

The phenolic and chloro-aliphatic acid reactants may be used in any desired proportions, but for purpose of economy, we usually employ from 0.8 to 2 molecular equivalents of the phenol per mole of the chloro-aliphatic acid. With regard to this point, it may be mentioned that, under otherwise similar reaction conditions, the rate of the reaction to form a salt of an aromatic-oxy-aliphatic acid and also the yield of such product increase with increase in the molecular ratio of the phenol to the chloro-aliphatic acid reactants from 0.8 to 2 or above, and that excess phenol over that required for the reaction may be recovered and be used in forming subsequent batches of the product. However, the extra steps involved in separating and recovering excess phenol in a form suitable for re-employment, and the decrease in productive capacity of a given reactor which results from use of a large excess of the phenolic reactant, detract from the advantages obtained by the use of excess phenol. The method of this invention permits production of the desired product in good yield from reaction mixtures which contain the stoichiometric amount, or only a moderate excess, of the phenolic reactant.

The phenolic and chloro-aliphatic acid reactants, or water-soluble salts thereof, are admixed with water and the mixture is brought to the optimum degree of alkalinity, i. e. such as to form salts of all of the chloro-aliphatic acid and from 80 to 100 per cent of the phenolic reactant. When using alkali metal salts of the reactants as starting materials, a suitable degree of alkalinity is obtained on dissolving the same in water. The proportion of water in the mixture is of secondary importance and may be varied widely. However, the reaction occurs most favorably, and the product is most readily separated from the reacted mixture when the latter contains water in amount not greatly exceeding that required to dissolve the reactants at the reaction temperature. Usually, water is present in amount not greater than twice that required to dissolve the organic reactants, but it may be used in much larger proportions.

The reaction materials may be admixed in any of several ways, e. g. by preforming salts of the phenolic and chloro-aliphatic acid reactants and dissolving them in water, or by admixing the phenol and chloro-aliphatic acid with water and adding alkali, etc. In practice, the chloro-aliphatic acid is usually reacted with an alkali metal hydroxide to form a salt thereof, while cooling the mixture. The phenol is dissolved in an aqueous alkali metal hydroxide solution containing from 0.8 to 1 molecular equivalent of the alkali per mole of the phenol. The resultant phenol salt solution is heated to a reaction temperature above 80° C., usually to boiling under reflux, and the salt of the chloro-aliphatic acid is added with stirring.

Heating and stirring are continued while adding an alkali, e. g. usually an aqueous alkali metal hydroxide solution, as necessary in order to maintain the mixture at approximately its initial pH value. Such addition of the alkali to control the alkalinity of the mixture may be accomplished manually using an indicator or other usual device to detect changes in the pH value, but it is conveniently accomplished automatically by an alkali feed mechanism actuated and controlled by a pair of electrodes immersed in the reaction mixture. Such devices for automatic feed of a material to a system in response to changes in an electrical characteristic of the system are well known.

When further addition of alkali is no longer required in order to maintain the mixture at a constant pH value, the reaction is complete. Usually, the reaction is discontinued slightly short of this point, i. e. when the rate of alkali feed has decreased to a small and almost negligible value. The time required to carry out the reaction varies with changes in the reactants employed and the concentration and relative proportions of the reactants, but usually is in the order of from 1 to 10 hours.

After completing the reaction, the aromatic-oxy-aliphatic acid salt product may be crystallized from the mixture. In most instances, nearly complete crystallization may be obtained merely by cooling the mixture to room temperature or thereabout. The product is removed, washed free of mother liquor and dried. It is usually of high purity.

Instead of recovering the product in the form of its salt, the crude reacted mixture may be acidified, e. g. with hydrochloric or sulphuric acid, and the aromatic-oxy-aliphatic acid thus liberated from its salt may be recovered by extraction with water-immiscible solvent such as ether and subsequent purification by usual procedures such as fractional distillation or crystallization. Alternatively, the salt of said acid product, after being isolated as described above, may be treated with a mineral acid to obtain the aromatic-oxy-aliphatic acid in free form.

The reaction may, if desired, be carried out under pressure in a bomb or autoclave at temperatures above 100° C., e. g. at from 100° to 150° C., or higher, provided alkali is injected into the mixture as necessary in order to maintain a substantially constant pH value during the course of the reaction. The reaction may also be carried out continuously by passing the reaction mixture through a heated tubular autoclave provided with a series of inlets for injecting alkali into the mixture as required in order to maintain the mixture at a nearly constant pH value throughout the length of the reactor.

The following examples describe a number of ways in which the principle of the invention has been applied, but are not to be construed as limiting the scope of the invention.

EXAMPLE 1

Approximately 163 grams (1 mole) of 2,4-dichlorophenol, 94.5 grams (1 mole) of chloroacetic acid, 80 grams (2 moles) of sodium hydroxide and 1160 grams of water were admixed. The procedure in forming the mixture was to neutralize a mixture of the 2,4-dichlorophenol and 800 grams of water with an aqueous sodium hydroxide solution of 30 per cent concentration and separately to neutralize the chloroacetic acid with the sodium hydroxide solution. The resultant sodium dichlorophenate solution was heated to boiling under reflux and the sodium chloroacetate solution was added with stirring. The reaction mixture, which initially was of a pH value of 10.5, was maintained at the boiling temperature of about 106° C. for 13 hours. During heating, the pH value of the mixture was determined from time to time and was found to decrease gradually to a value of 7. After heating of the mixture for the time just stated, a dilute sodium hydroxide solution was added in amount sufficient to bring the mixture to a pH value of 10. The mixture was then cooled to 25° C. so as to crystallize the sodium 2,4-dichlorophenoxyacetate product and the latter was removed by filtration. There was obtained 177 grams (0.72 mole) of the dry sodium dichlorophenoxyacetate, the yield thereof being 72 per cent of theoretical based on the chloroacetic acid. The mother liquor remaining after crystallization of the product from the reaction mixture was acidified with hydrochloric acid, whereupon 52 grams of an oil separated. The oil contained 0.22 gram mole of unreacted dichlorophenol and 0.04 gram mole of dichlorophenoxy acetic acid. No chloroacetic acid was recovered.

EXAMPLE 2

A series of experiments were carried out as in Example 1, except that the reaction mixtures differed in initial pH value in the different experiments and that during each reaction a dilute aqueous sodium hydroxide solution was added as necessary to maintain the mixture of constant pH value. After completing each reaction, the mixture was brought to a pH value of 10, cooled to 25° C. to crystallize the sodium 2,4-dichlorophenoxyacetate product and the latter was separated. The following table gives the pH value at which each mixture was maintained during the reaction to form the sodium dichlorophenoxyacetate and gives the per cent yield of the latter, based on the chloroacetic acid in the starting mixture.

Table I

| Run No. | pH | Per Cent Yield |
|---|---|---|
| 1 | 8 | 59.0 |
| 2 | 9.2 | 77.8 |
| 3 | 10 | 79.0 |
| 4 | 11 | 78.5 |
| 5 | 12 | 72.0 |

The above data is the basis for the graph shown as Fig. 1 of the drawing. It will be noted that the yields are highest when a mixture is maintained of a pH value of from 9 to 11 during the reaction and that they decrease sharply when the pH value is varied outside these limits. From a comparison of Example 1 (wherein the pH value was permitted to decrease from 10.5 to 7 during a reaction) with runs 2–4 of the above table, it will be seen that the yield is improved considerably by adding an alkali during a reaction as necessary in order to maintain the mixture of a pH value between 9 and 11 throughout the reaction period.

EXAMPLE 3

Another series of experiments were carried out as in Example 1, except that the molecular ratios of 2,4-dichlorophenol to chloroacetic acid in the starting mixtures were varied from one experiment to another and that in each experiment the reaction mixture was maintained at a pH value of 10 throughout the reaction by gradual addition of a 5-normal aqueous sodium hydroxide solution. Since, except for such addition of alkali during a reaction, the pH value decreases as the reaction progresses, the rate at which the sodium hydroxide must be added to maintain the mixture of constant pH value is a good index as to the extent of the reaction at any time, i. e. the rate at which the alkali need be added becomes less as the reaction approaches completion. In each experiment, the reaction was considered complete when less than 0.5 cubic centimeter of the 5-normal sodium hydroxide solution was added over a period of 30 minutes in order to maintain the reaction mixture of constant pH value. The time required to complete the reaction to this point was noted. Table II gives the molecular ratio of 2,4-dichlorophenol to chloroacetic acid in each starting mixture, the time in hours required to complete the reaction to the point just mentioned, and the yield of the sodium 2,4-dichlorophenoxyacetate product, based on the amount of chloroacetic acid in the starting mixture.

Table II

| Run No. | Mole Ratio of Dichlorophenol to Chloroacetic Acid | Reaction Time, Hrs. | Per Cent Yield |
|---|---|---|---|
| 1 | 0.8 | 7 | 73.5 |
| 2 | 1.0 | 7 | 79.0 |
| 3 | 1.5 | 4 | 88.5 |
| 4 | 2.0 | 1.5 | 94.6 |

The data of Table II corresponds to the graphs shown as Figs. 2 and 3 of the drawing.

EXAMPLE 4

The procedure of Example 1 was applied in reacting sodium chloroacetate with an equimolecular amount of sodium beta-naphthate. Alkali was not added during the reaction. Sodium beta-naphthoxyacetate was obtained in 54 per cent of the theoretical yield, based on the amount of chloroacetate in the starting mixture. The experiment was repeated, except that a mixture of beta-naphthol and from 80 to 85 per cent of its chemical equivalent of sodium hydroxide was used instead of sodium beta-naphthate in the starting mixture and that a dilute aqueous sodium hydroxide solution was added during the reaction, as necessary in order to maintain the mixture at its initial pH values of from 9 to 11. The yield of sodium beta-naphthoxyacetate was 87 per cent of theoretical, based on the sodium chloroacetate starting material.

EXAMPLE 5

The procedure of Example 1 was applied in reacting sodium chloroacetate with an equimolecular amount of sodium 2,6-dimethoxyphenol. Sodium 2,6-dimethoxy-phenoxyacetate was obtained in less than 20 per cent of the theoretical yield, based on the sodium chloroacetate starting material. The experiment was repeated, except that a mixture of 2,6-dimethoxyphenol and from 80 to 85 per cent of its chemical equivalent of sodium hydroxide was used instead of sodium 2,6-dimethoxyphenol in the starting mixture and that a dilute aqueous sodium hydroxide solution was added during the reaction as necessary in order to maintain the mixture at its initial pH value of approximately 12.6. The yield of sodium 2,6-dimethoxyphenoxyacetate was 87 per cent of theoretical, based on the sodium chloroacetate starting material.

EXAMPLE 6

In separate experiments, procedure similar to that of Example 1 was applied in reacting sodium chloroacetate with the respective compounds 2-nitrophenol, 4-nitrophenol and 2,5-dimethylphenol. In each instance, sodium hydroxide was initially added in amount sufficient to form a salt with from 80 to 85 per cent of the phenol. The initial pH values were 7.2 for the mixture containing 2-nitrophenol, 8.5 for the mixture containing 4-nitrophenol and 13.5 for the mixture containing the dimethylphenol. During each reaction sodium hydroxide was added as necessary to maintain the reaction mixture at approximately its initial pH value. The sodium salts of 2-nitrophenoxyacetic acid, 4-nitrophenoxyacetic acid and 2,5-dimethylphenoxyacetic acid were obtained in yields of 55, 55 and 67 per cent of theoretical, respectively, based on the sodium chloroacetate used in the starting mixtures.

EXAMPLE 7

In each of three experiments, sodium alpha-chloropropionate was reacted with a sodium salt of a phenolic compound as in Example 1, except that during the reaction a dilute aqueous sodium hydroxide solution was added as required to maintain the reaction mixture at a substantially constant pH value. The phenolic reactants used in the respective experiments were the sodium salts of 2-chlorophenol, 3-chlorophenol and 2,4-dichlorophenol. As products there were obtained a 63 per cent yield of sodium 2-chlorophenoxypropionate, a 62 per cent yield of sodium 3-chlorophenoxypropionate and a 68 per cent yield of sodium 2,4-dichlorophenoxypropionate, said yields being based on the amount of sodium chloropropionate used as a starting material in the respective experiments.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making a salt of an aromatic-oxy-aliphatic acid by a reaction between salts of a chloroaliphatic acid and a phenol, the steps of forming an aqueous solution of a phenol, a water-soluble salt of a monochloroaliphatic monocarboxylic acid, and an alkali, which solution initially contains an alkali in amount chemically equivalent to between 80 and 100 per cent of the phenol and is of a pH value within a range corresponding to the presence of alkali in the proportions just stated, heating the mixture to a reaction temperature, and adding alkali as necessary to maintain the mixture within said range of pH values throughout the major part of the reaction.

2. In a method of making a salt of an aromatic-oxy-aliphatic acid by a reaction between salts of a chloro-aliphatic acid and a phenol, the steps of forming an aqueous solution of a phenol, a water-soluble salt of a monochloro-aliphatic monocarboxylic acid having from 2 to 3 carbon atoms in the molecule, and an alkali, which solution initially contains an alkali in amount chemically equivalent to between 80 and 100 per cent of the phenol and is of a pH value within a range corresponding to the presence of alkali in the proportions just stated, heating the mixture to a reaction temperature above 80° C., and adding an alkali during the reaction as necessary to maintain the mixture within said range of pH values.

3. In a method of making a salt of an aromatic-oxy-aliphatic acid by a reaction between salts of a chloro-aliphatic acid and a phenol, the steps of forming an aqueous solution of 1 molecular equivalent of a water-soluble salt of a saturated monochloro-aliphatic monocarboxylic acid having from 2 to 3 carbon atoms in the molecule, from 0.8 to 2 molecular equivalents of a phenol, and an alkali, which solution initially contains an alkali in amount chemically equivalent to between 80 and 100 per cent of the phenol and is of a pH value within a range corresponding to the presence of alkali in the proportions just stated, heating the solution to a reaction temperature above 80° C., and adding alkali during the reaction as necessary in order to maintain the mixture within said range of pH values.

4. A method, as described in claim 3, wherein the phenolic reactant is 2,4-dichlorophenol.

5. A method, as described in claim 3, wherein the phenolic reactant is 2,4-dichlorophenol and the salt of a saturated alpha-chloro-aliphatic monocarboxylic acid is an alkali metal salt of chloroacetic acid.

6. A method, as described in claim 3, wherein the phenolic reactant is a dimethoxyphenol.

7. A method, as described in claim 3, wherein the phenolic reactant is 2,6-dimethoxyphenol and the salt of a saturated alpha-chloro-aliphatic monocarboxylic acid is an alkali metal salt of chloroacetic acid.

8. A method, as described in claim 3, wherein the phenolic reactant is a naphthol.

9. A method, as described in claim 3, wherein the phenolic reactant is beta-naphthol.

10. A method, as described in claim 3, wherein the phenolic reactant is beta-naphthol and the salt of a saturated alpha-chloro-aliphatic monocarboxylic acid is an alkali metal salt of chloroacetic acid.

11. In a process for producing sodium 2,4-dichlorophenoxyacetate the steps comprising effecting reaction between monochloroacetic acid and 2,4-dichlorophenol in an aqueous solution maintained at a pH of about 9.0 by stepwise adjustment with sodium hydroxide.

12. In a method wherein a monohydric phenol, monochloroacetic acid, and sodium hydroxide are reacted together in the presence of water as a reaction medium to form a salt of an aryloxy acetic acid, the steps of adding sodium hydroxide during the reaction at a rate sufficient to maintain the reaction mixture at a pH value higher than 8, but such as to avoid presence in the reacting mixture at any instant, of sodium hydroxide in amount greater than the chemical equivalent of the sum of the phenolic and acidic components of the mixture.

LUTHER F. BERHENKE.
LOUIS E. BEGIN.

REFERENCES CITED

The following references are of record in the file of this patent:

Spica: Gazz. Chim. Italiana, vol. 16, pages 438, 441 (1886).

Lees et al.: Journ. Chem. Soc. (London), vol. 83, page 758 (1903).

Shebata et al.: Chem. Abstracts, vol. 30, page 4490 (1936).

Pokorny: J. Am. Chem. Soc., 63, 1768 (1941).